United States Patent [19]

Eriksson

[11] 3,945,413

[45] Mar. 23, 1976

[54] FEEDING DEVICE

[76] Inventor: Bror Evert Eriksson, Pl 1813, 820 11 Vallsta, Sweden

[22] Filed: Mar. 19, 1975

[21] Appl. No.: 559,982

[30] Foreign Application Priority Data
Mar. 19, 1974  Sweden .............................. 7403653

[52] U.S. Cl. .............. 144/246 R; 83/436; 193/35 R
[51] Int. Cl.² ........................................... B27C 1/12
[58] Field of Search ....... 83/436; 144/246 R, 246 B, 144/246 C, 246 D; 193/35 R, 35 S; 198/127 R

[56] References Cited
UNITED STATES PATENTS

| 1,567,441 | 12/1925 | Howard | 144/246 B |
|---|---|---|---|
| 2,726,754 | 12/1955 | Rodder | 198/127 R X |
| 3,039,584 | 6/1962 | McConnell et al. | 144/246 R X |
| 3,788,371 | 1/1974 | Mason | 83/436 X |

FOREIGN PATENTS OR APPLICATIONS

| 1,102,583 | 10/1955 | France | 198/127 R |

Primary Examiner—Al Lawrence Smith
Assistant Examiner—James G. Smith
Attorney, Agent, or Firm—Diller, Brown, Ramik & Wight

[57] ABSTRACT

The present invention is related to a feeding device comprising a number of rotatable rolls or the like, each of which being provided with a number of individual, annular or part-annular feeding members around the circumference of the roll and suitably provided with toothing or knurling to feed goods, such as objects of wood, in a direction essentially perpendicular to the axis of rotation of the rolls, wherein one or a plurality of the feeding members are inclined, so that planes in which their perimeters are essentially lying form oblique angles to planes perpendicular to the rotation axis of the rolls, whereby the places of engagement between the feeding members and the goods being feeded constantly are wandering to and fro when the rolls are rotated.

10 Claims, 3 Drawing Figures

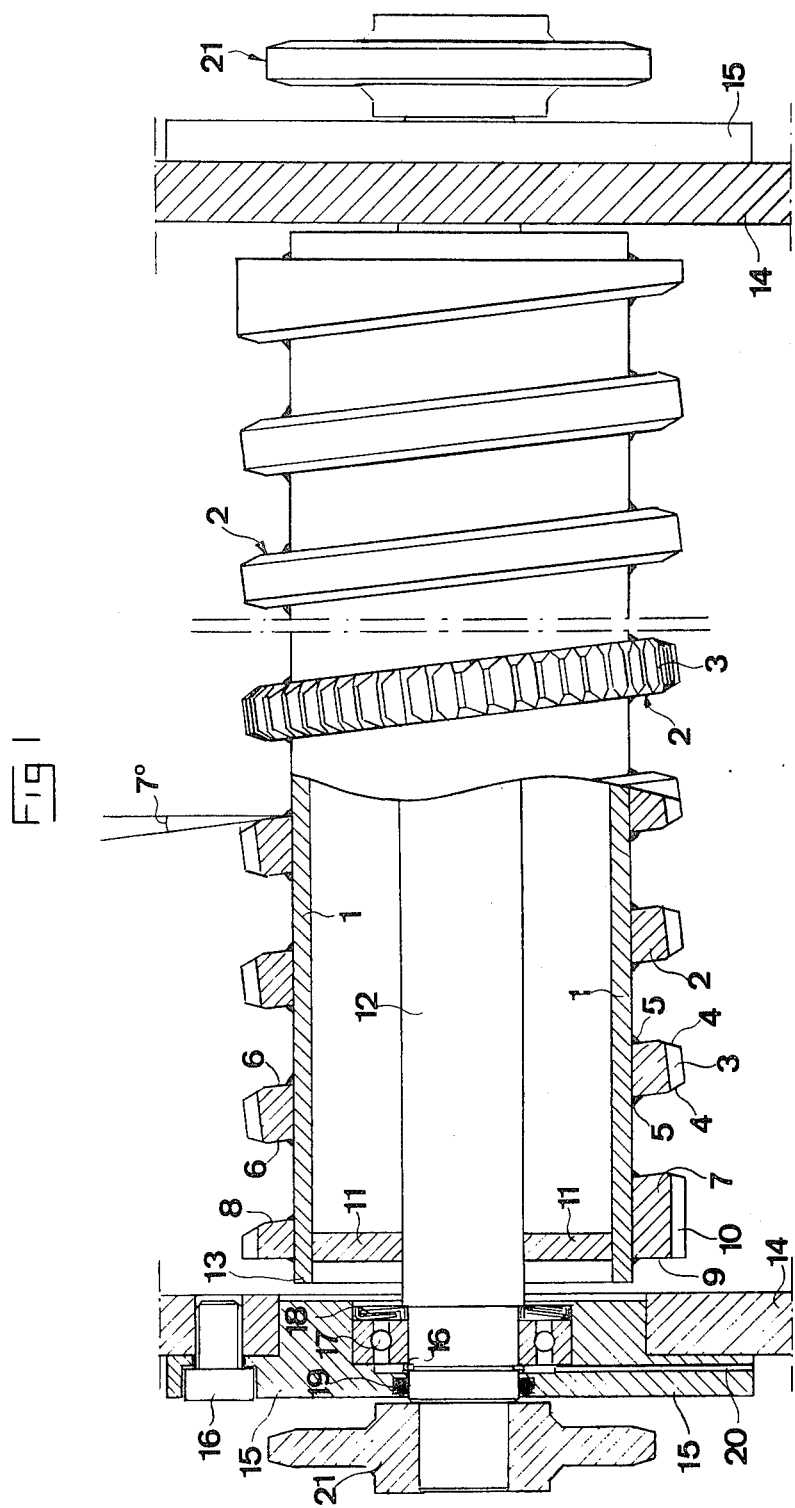

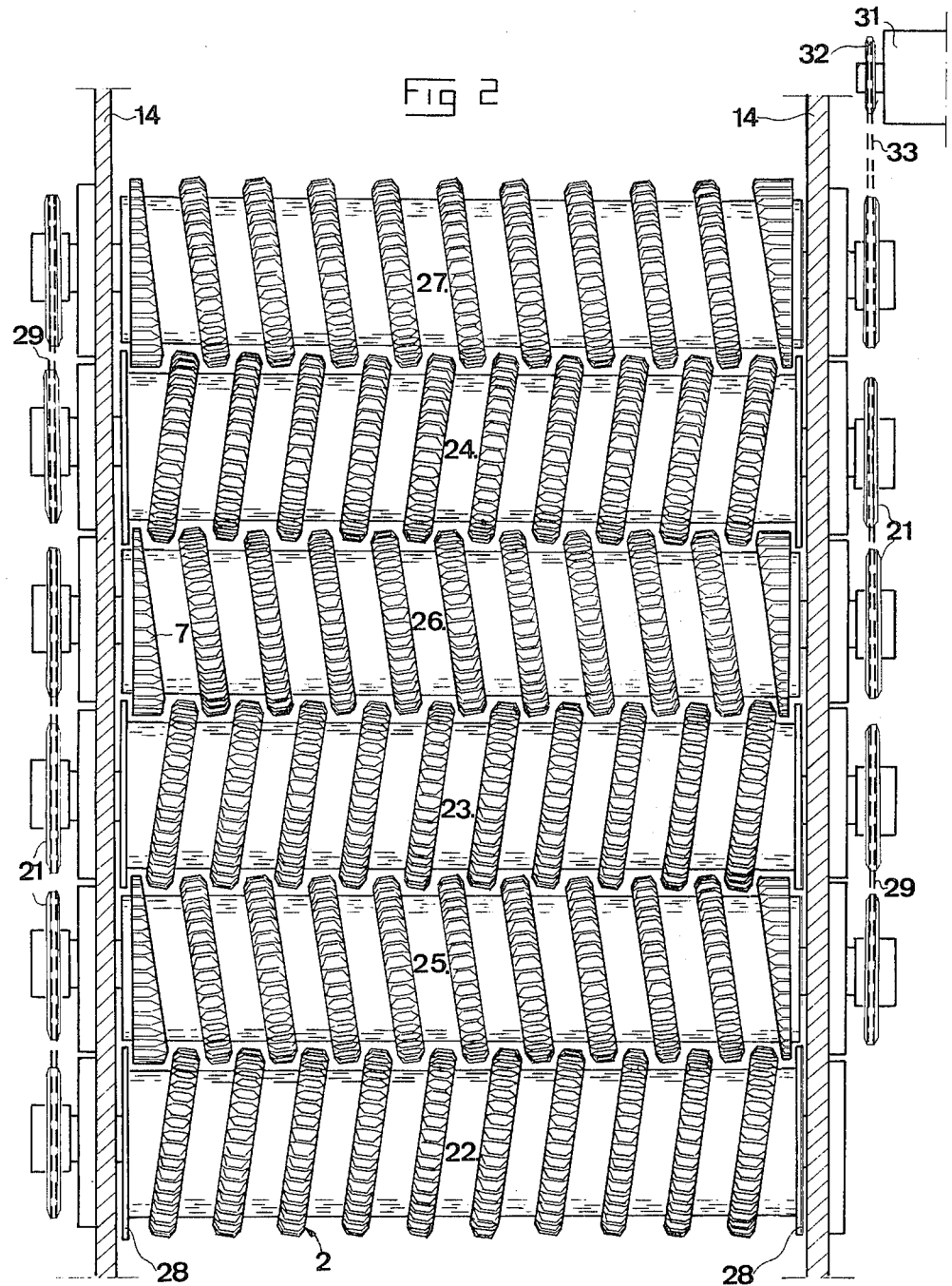

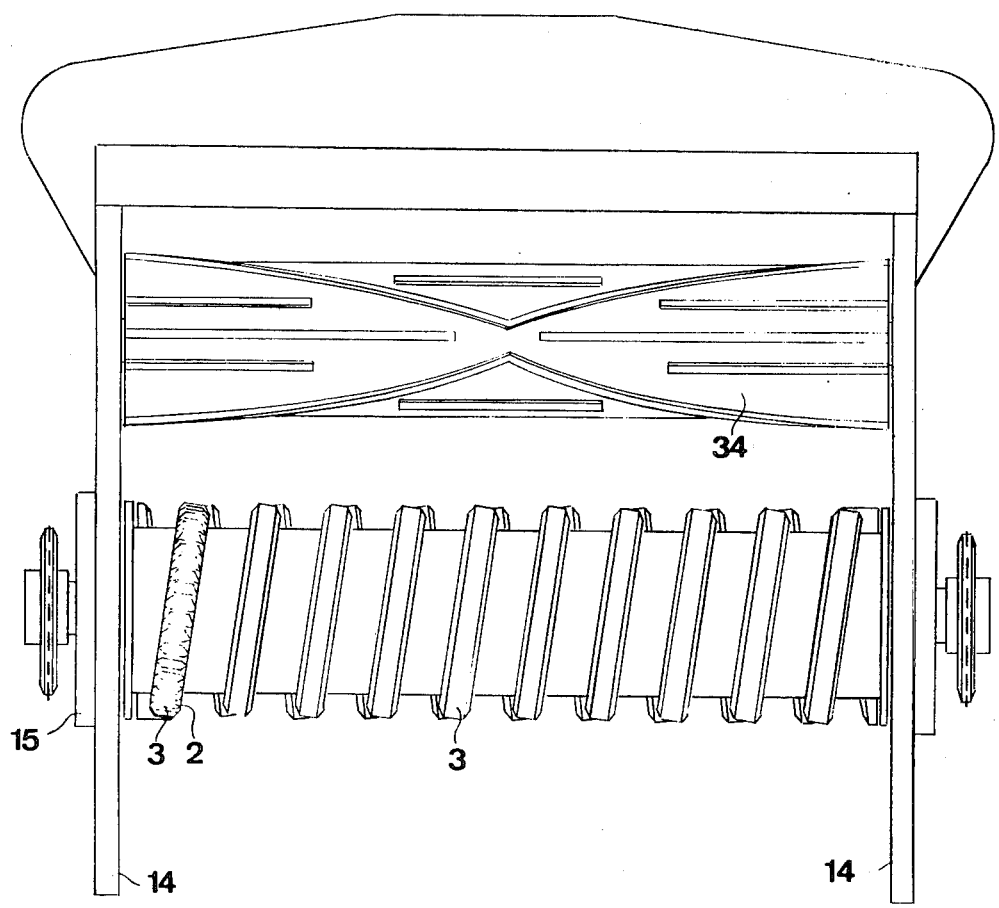

FEEDING DEVICE

The present invention is related to a feeding device comprising a number of rotatable rolls or the like, each of which being provided with a number of individual, entirely or partly annular feeding members arranged around the circumference of the roll and suitably provided with toothing or knurling to feed goods, such as objects of wood, in a direction essentially perpendicular to the axis of rotation of the rolls.

Such feeding devices are for instance used in saw mills, wood working plants or the like. One type of the feeding devices previously known comprises a plurality of parallel, rotatable feeding rolls entirely or partly provided with some kind of knurling or toothing on the surfaces to engage objects intended for feeding. A further known device comprises a plurality of parallel, rotatable rolls, each comprising a plurality of toothed or knurled rings arranged perpendicularly to the longitudinal direction of the rolls. Further it is known to design feeding rolls having helical feeding members.

The above and other types of known feeding devices are, however, suffering from the disadvantage that breakdowns or stoppages frequently occur in the feeding due to the fact that the feeding members dig into the surfaces of the goods being fed and lose their driving engagement, which causes wedging the objects between the rolls. This problem is particularly serious in feeding of damp, recently felled wood materials.

In preparation of wood chips, feeding into chip cutters, has proved to be problematic with feeding devices of the prior art, since it is desirable to feed unprepared wood objects, such as unpruned trees, waste products from plywood manufacture and the like.

The object of the present invention is to remove the above related disadvantages and to provide a feeding device which with excellent capacity is able to perform the feeding without breakdowns caused by wedging effects and the like.

This object is in accordance with the invention obtained by inclining one or a plurality of the feeding members in such a way, that planes in which their perimeters essentially are lying form oblique angles to planes perpendicular to the axis of rotation of the rolls, whereby the places of engagement between the feeding members and the goods being feeded constantly wander to and fro in rotation of the rolls.

By the fact that the feeding members of the rolls due to the inclination constantly change their places of engagement relative to goods being feeded, the risk of wedging the goods or digging of the feeding members into the material of the goods is removed. In tests with feeding devices according to the invention coupled to chip cutters, it has proved to be possible to easily feed entirely unpruned trees having solid branches. The degree of the inclination of the feeding members relative to planes perpendicular to the rotation axis of the rolls is about 2° to 25°, or preferably 4° to 12°, although these principle values of course may be varied within wide limits due to the field of use. In rotation of the rolls, the working angles are also continuously changed relative to goods being feeded, which fact further improves the feeding ability.

The mutual positions of the feeding members on every single roll may, of course, be chosen arbitrarily, but according to a preferred embodiment the planes through perimeters of two or more feeding members are parallel to each other.

A further feature of the invention is that feeding members of a roll protrude, with suitable clearance, between feeding members of at least one adjacent roll.

To obtain this feature it is required that the dimensions of the feeding members in the longitudinal direction of the rolls are less than the dimensions of the corresponding spaces between and at the sides of the feeding members of the rolls, that the rolls in each moment of rotation are lying in a determined phase relation with each other, that the feeding members of each single roll are substantially parallel to each other, and that all feeding members of the feeding rolls have equal inclination.

All feeding rolls in the feeding device should be arranged for synchronous rotation with one another, i.e. with the same speed, every second roll being arranged to rotate in a determined phase and the other rolls to rotate in another phase, which differs substantially 180° from said first-mentioned phase. Hereby is attained that the feeding members in rotation describe a feeding promoting "zig-zag" movement.

With reference to the appended drawings, below follows a more specific description of an embodiment according to the invention cited as an example.

In the drawings:

FIG. 1 is a plane view, partly sectional, of a feeding roll in accordance with the invention.

FIG. 2 is a top view of a feeding device, comprising a plurality of feeding rolls.

FIG. 3 is a front view of a feeding device at an inlet opening of a chip cutter.

FIG. 1 shows a feeding roll comprising a tubular portion 1 constituting the envelope surface of the roll and a plurality of individual annular feeding members 2. These feeding members 2 are secured to the tubular part 1 by means of welds 5, each of said feeding members being arranged in a position inclined to a plane perpendicular to the longitudinal direction of the roll. The inclination in the example is about 7°. In order to obtain a close fit between the inclined feeding members 2 and the circular roll, the feeding members may be more or less oval. In moderate angles of inclination, as in the figures, the feeding members may, however, be designed circular and thus a certain play may be accepted. The feeding members have on the circumference a knurling or toothing 3 for engagement with objects to be feeded. The toothing 3 is on the sides finished by bevels 4 and are furthermore arranged perpendicular to the sides 6 of the feeding members, for what reason the end surfaces of the toothings 3 constantly change angles of engagement against goods being feeded in rotation of the roll. The feeding members 7 at the ends of the feeding roll have an inclination at the surfaces 8 facing the central portion of the feeding roll in resemblance to the feeding members 2, but said feedimg members 7 are perpendicular to the longitudinal axis of the roll at the surfaces 9 facing the ends of the feeding roll. The toothings 10 of the feeding members 7 are in this embodiment parallel to the longitudinal axis of the roll in order to avoid wedging effects. The tubular portion 1 of the feeding roll may be welded to annular pieces 11 which in turn are secured to a shaft 12 through the feeding roll. The attachment of the tubular portion 1 to the pieces 11 is suitably performed so that projecting shoulders 13 are formed in order to provide a minimum of open space between the tubular portion 1 and the walls 14 of the feeding device.

The mounting of the feeding rolls to the walls 14 of the feeding device is performed by means of bearing bushes 15 and screws 16 to secure the bushes to the walls 14. Within the bearing bush 15 there is a bearing 17 as well as sealing lamella 18. The bearing 17 is secured by a clamp ring 16 placed in a groove in the shaft 12, a sealing 19 in the form of an O-ring being arranged outside the bearing 17. Lubricant channels 20 to the bearing 17 are arranged in the bush 15. Chain wheels 21 are secured to the ends of shaft 12 for driving the feeding roll through a driving chain.

FIG. 2 shows a plurality of feeding rolls 22 – 27 provided with annular feeding members 2. The rolls 22, 23, 24 are at the ends provided with discs 28 intended to rotate adjacent the walls 14 of the feeding device. The rolls 25, 26, 27 are at the ends provided with feeding members 7 for efficient feeding close to the walls and to avoid wedging effects. Each of said annular feeding members of one roll protrudes more or less into a space between or at the side of the annular feeding members of adjacent roll or rolls. To enable this all rolls are arranged to rotate synchronously, i.e. with the same speed, the rolls 22, 23, 24 rotating with a phase displacement of essentially 180° and with feeding members slightly axially displaced relative to the rolls 25, 26, 27. The rolls are synchronously driven by means of chains 27 and chain wheels 21 in an alternate relation appearing by the figure. The rolls are rotated by a schematically shown driving motor 31 connected to the rolls by means of a chain wheel 32 and a chain 33. The members 7 exhibit the tapered form previously mentioned to fit in the varying spaces between the members 2 and the discs 28 at the rotation of the rolls. In operation of the device, the feeding members are imparted a wobbling movement eminently promoting the feeding, the engagement surfaces and angles of the feeding members against objects being feeded changing constantly.

FIG. 3 shows a front view of an inlet opening into a feeding device of a chip cutter. The feeding rolls according to the invention are here rotated 90° in relation to the position in FIG. 2. Above the feeding device there are one or more rotatable pressure and feeding rolls 34 known per se, which are arranged to assist in the feeding as well as to press the objects against the rolls of the feeding device.

With the expression "individual" feeding members should also be interpreted two or more members which together form what may be considered as individual in this specification.

The invention is not limited only to the embodiment shown in the drawings. Thus it is possible to design the feeding members in several different ways, the toothing for instance being provided annularly directly on the circumference of the feeding rolls or integrally to the envelope surfaces thereof. The feeding members must not necessarily be shaped as closed rings, since it is possible to design the feeding members as ring sections, which may possibly be mutually displaced on the rolls. Although the rolls with their feeding members are shown in a certain engaging relation and are synchronously driven in a determined phase relation, it is within the scope of the invention to increase the distance between the rolls and to operate them independently. I independent operation of the rolls it is possible to vary the inclination and mutual relation of the feeding members. Further it is not necessary to use the tapering feeding members 7; they may possibly be deleted. Further modifications are conceivable within the scope of the appended claims.

What I claim is:

1. Feeding device comprising a number of rotatable rolls, each roll being provided with a number of individual, at least part-annular feeding members around the circumference thereof and suitably provided with toothing to feed goods in a direction essentially perpendicular to the axis of rotation of the rolls, said feeding device being characterized in that at least one of the feeding members is inclined, so that a plane in which its perimeter essentially lies forms oblique angles to planes perpendicular to the rotation axis of the rolls, whereby the places of engagement between said at least one feeding member and the goods being fed constantly are wandering to and fro when the rolls are rotated.

2. Feeding device as claimed in claim 1, wherein the inclination of the inclined feeding member is 2° to 25°.

3. Feeding device as claimed in claim 1, wherein a plurality of the feeding members are inclined, and the inclined feeding members are equally inclined.

4. Feeding device as claimed in claim 3, wherein planes through perimeters of at least two feeding members on at least one of the rolls are parallel.

5. Feeding device as claimed in claim 4, wherein the rolls are coupled for synchronous rotation with one another, and every second roll is arranged to rotate in one phase and the other rolls are arranged to rotate in another phase, which is displaced substantially 180° from said first mentioned phase.

6. Feeding device as claimed in claim 5, wherein at least two of said rolls are parallel, and wherein feeding members of one of said parallel rolls protrudes, with suitable clearance, between feeding members of at least an adjacent parallel roll.

7. Feeding device as claimed in claim 1, wherein the feeding member of each roll closest to an end of the roll has a surface towards that end of the roll and lies perpendicular to the axis of rotation of the roll.

8. Feeding device as claimed in claim 1, wherein the feeding members of each roll are annular toothings directly on envelope surfaces of the rolls.

9. Feeding device as claimed in claim 1, wherein the feeding members are bevelled.

10. Feeding device as claimed in claim 2, wherein the inclination is 4° to 12°.

* * * * *